(12) United States Patent
Scheffer et al.

(10) Patent No.: US 7,712,064 B2
(45) Date of Patent: May 4, 2010

(54) MANUFACTURING AWARE DESIGN OF INTEGRATED CIRCUIT LAYOUTS

(75) Inventors: Louis K. Scheffer, Campbell, CA (US); Akira Fujimura, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 578 days.

(21) Appl. No.: 11/419,495

(22) Filed: May 20, 2006

(65) Prior Publication Data

US 2006/0265679 A1 Nov. 23, 2006

Related U.S. Application Data

(63) Continuation-in-part of application No. 11/214,472, filed on Aug. 28, 2005, now Pat. No. 7,395,516.

(60) Provisional application No. 60/683,440, filed on May 20, 2005.

(51) Int. Cl.
*G06F 17/50* (2006.01)

(52) U.S. Cl. .................. 716/8; 716/4; 716/5; 716/6; 716/10; 716/11; 716/12

(58) Field of Classification Search ................ 716/4–6, 716/8, 10–12
See application file for complete search history.

(56) References Cited

U.S. PATENT DOCUMENTS 5,923,562 A * 7/1999 Liebmann et al. ............. 716/19

6,069,350 A * 5/2000 Ohtsuka et al. .......... 250/208.1
6,269,470 B1 7/2001 Paz
6,303,276 B1 * 10/2001 Savant et al. ................ 430/321

(Continued)

FOREIGN PATENT DOCUMENTS

| WO | PCT/US06/019624 | 5/2006 |
|---|---|---|
| WO | WO 2006/127538 | 11/2006 |
| WO | WO2006127538 | 11/2006 |

OTHER PUBLICATIONS

Kong; "CAD for nanometer silicon design challenges and success"; Nov. 2004; Very Large Scale Integration (VLSI); Systems, IEEE Transactions on; vol. 12, Issue 11, pp. 1132-1147.*

(Continued)

*Primary Examiner*—Helen Rossoshek
(74) *Attorney, Agent, or Firm*—Adeli & Tollen LLP

(57) ABSTRACT

Some embodiments of the invention provide a manufacturing aware process for designing an integrated circuit ("IC") layout. The process receives a manufacturing configuration that specifies a set of manufacturing settings for a set of machines to be used to manufacture an IC based on the IC layout. The process defines a set of design rules based on the specified manufacturing configuration. The process uses the set of design rules to design the IC layout. Some embodiments of the invention provide a design aware process for manufacturing an integrated circuit ("IC"). The process receives an IC design with an associated set of design properties. The process specifies a manufacturing configuration that specifies a set of manufacturing settings for a set of machines to be used to manufacture the IC, where the specified set of manufacturing settings are based on the set of design properties. The process manufactures the IC based on the manufacturing settings.

36 Claims, 12 Drawing Sheets

U.S. PATENT DOCUMENTS

| | | | |
|---|---|---|---|
| 6,388,736 | B1 | 5/2002 | Smith et al. |
| 6,466,304 | B1 | 10/2002 | Smith |
| 6,516,450 | B1 | 2/2003 | Hill et al. |
| 6,553,562 | B2 | 4/2003 | Capodieci et al. |
| 6,577,994 | B1 * | 6/2003 | Tsukuda ................ 703/15 |
| 6,804,809 | B1 * | 10/2004 | West et al. ............. 716/11 |
| 6,855,486 | B1 | 2/2005 | Finders et al. |
| 6,871,338 | B2 * | 3/2005 | Yamauchi .............. 716/19 |
| 6,915,252 | B1 * | 7/2005 | Li ........................... 703/22 |
| 6,915,505 | B2 | 7/2005 | Hsu et al. |
| 7,000,205 | B2 | 2/2006 | Devgan et al. |
| 7,000,207 | B2 | 2/2006 | Gothoskar et al. |
| 7,030,966 | B2 | 4/2006 | Hansen |
| 7,079,223 | B2 | 7/2006 | Rosenbluth et al. |
| 7,096,447 | B1 * | 8/2006 | Li et al. ................. 716/11 |
| 7,138,212 | B2 * | 11/2006 | Hsu et al. ............... 430/5 |
| 7,174,520 | B2 * | 2/2007 | White et al. ............ 716/4 |
| 7,241,539 | B2 * | 7/2007 | Kim et al. ............... 430/5 |
| 7,395,516 | B2 | 7/2008 | Fujimura et al. |
| 2003/0198872 | A1 | 10/2003 | Yamazoe et al. |
| 2004/0015794 | A1 | 1/2004 | Kotani et al. |
| 2004/0029024 | A1 | 2/2004 | Ohnuma |
| 2004/0121244 | A1 | 6/2004 | Misaka |
| 2005/0005257 | A1 | 1/2005 | Eurlings et al. |
| 2005/0044514 | A1 * | 2/2005 | Wu et al. ................ 716/5 |
| 2005/0102648 | A1 | 5/2005 | Hsu et al. |
| 2005/0138598 | A1 | 6/2005 | Kokubun |
| 2005/0216877 | A1 | 9/2005 | Pack et al. |
| 2005/0251771 | A1 | 11/2005 | Robles |
| 2005/0283747 | A1 | 12/2005 | Adam |
| 2006/0046168 | A1 | 3/2006 | Fukuhara |
| 2006/0066855 | A1 | 3/2006 | Boef et al. |
| 2006/0090146 | A1 * | 4/2006 | LeBritton et al. ....... 716/4 |
| 2006/0177747 | A1 | 8/2006 | Misaka |
| 2006/0265679 | A1 | 11/2006 | Scheffer et al. |
| 2007/0094623 | A1 * | 4/2007 | Chen et al. .............. 716/4 |
| 2008/0307371 | A1 | 12/2008 | Fujimura et al. |

OTHER PUBLICATIONS

Non-Final Office Action U.S. Appl. No. 11/214,472, filed Aug. 28, 2005, Fujimura, et al., Non-Final Rejection mailed Nov. 3, 2006 of a related application.

Non-Final Office Action U.S. Appl. No. 11/214,472, filed Aug. 28, 2005, Fujimura, et al., Nov. 3, 2006, Non-Final Rejection mailed Feb. 14, 2007 of a related application.

Gupta, et al., "Manufacturing-aware physical design", Computer Aided design, ICCAD-2003. International Conference on pp. 681-687, Nov. 9-13, 2003.

International Search Report, Jan. 11, 2007, Cadence Design Systems, Inc., International Search Report of PCT Application based on U.S. Appl. No. 11/419,495.

Written Opinion of the International Search Report Authority, Jan. 11, 2007, Cadence Design Systems, Inc., Written Opinion of the International Searching Authority of PCT Application based on U.S. Appl. No. 11/419,495.

Final Office Action U.S. Appl. No. 11/214,472, Fujimura, et al., Final Office Action mailed Aug. 31, 2007 of a related application.

International Preliminary Report on Patentability for PCT/US2006/019624 includes Written Opinion and Invitation to pay additional fee, mailed Nov. 23, 2007, Cadence Design Systems, Inc., International Preliminary Report on Patentability of a Corresponding PCT Application.

Notice of Allowance of U.S. Appl. No. 11/214,472, mailed Feb. 19, 2008, Fujimura, Akira, et al.

* cited by examiner

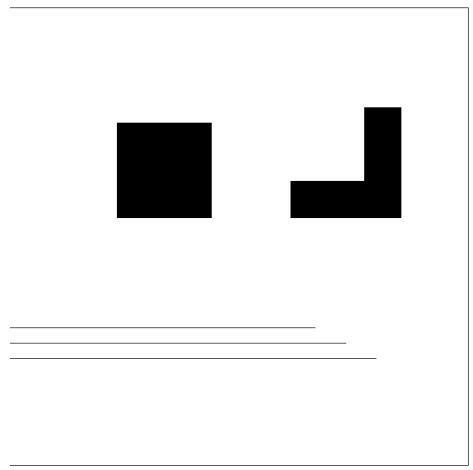
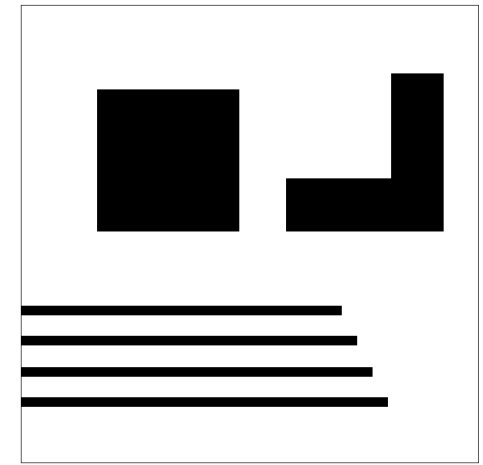
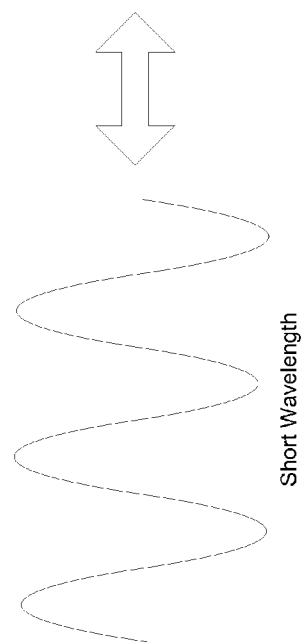
*Figure 7*
*Figure 8*

MANUFACTURING AWARE DESIGN OF INTEGRATED CIRCUIT LAYOUTS

CLAIM OF BENEFIT TO PRIOR APPLICATIONS

This application claims benefit to U.S. Provisional Patent Application 60/683,440, filed May 20, 2005, entitled "Method and System for Increasing the Yield of Integrated Circuit Manufacturing." This application is also a continuation-in-part of U.S. patent application Ser. No. 11/214,472, filed Aug. 28, 2005, now U.S. Pat. No. 7,395,516 entitled "Manufacturing Aware Design and Design Aware Manufacturing." Both applications are incorporated hereinafter by reference.

FIELD OF THE INVENTION

The present invention is directed towards manufacturing aware design and design aware manufacturing.

BACKGROUND OF THE INVENTION

An integrated circuit ("IC") is a device (e.g., a semiconductor device) that includes many electronic components, such as transistors, resistors, diodes, etc. These components are often interconnected to form multiple circuit components, such as gates, cells, memory units, arithmetic units, controllers, decoders, etc. An IC includes multiple layers of wiring that interconnect its electronic and circuit components.

Design engineers design IC's by transforming logical or circuit descriptions of the IC's components into geometric descriptions, called layouts. IC layouts typically include (1) circuit modules (i.e., geometric representations of electronic or circuit IC components) with pins, and (2) interconnect lines (i.e., geometric representations of wiring) that connect the pins of the circuit modules. A net is typically defined as a collection of pins that need to be connected. To create layouts, design engineers typically use electronic design automation ("EDA") applications. These applications provide sets of computer-based tools for creating, editing, and analyzing IC design layouts.

Fabrication foundries ("fabs") manufacture ICs based on these IC design layouts. To fabricate an IC after designing of the IC layout is completed, a lithographic plate (photomask) is created based on the IC layout so that the photomask contains the various geometries of the IC layout. The various geometries contained on the photomask represent the IC elements (such as IC components, interconnect lines, via pads, etc.) to be created on a wafer in a particular circuit pattern, the wafer forming the base of the integrated circuit.

In some circumstances, some fabs are not able to manufacture ICs based on an IC design layout that is otherwise valid. This is due to the fact that the IC design layout requires certain manufacturing capabilities/settings that the fab does not have. As such, these IC design layouts do not take into account manufacturing constraints. Accordingly, because of these manufacturing constraints, the IC design layout needs to be modified to account for these manufacturing constraints. However, such modifications are made after the IC design layout is designed and sent over to the fabs.

Thus, there is a need in art for a set of computer-based tools that are capable of factoring constraints of the manufacturing process (e.g. lithography process). Similarly, there is a need in art for a set of manufacturing processes that are aware of constraints used to design an IC.

BRIEF SUMMARY OF THE INVENTION

Some embodiments of the invention provide a manufacturing aware process for designing an integrated circuit ("IC") layout. The process receives a manufacturing configuration that specifies a set of manufacturing settings for a set of machines to be used to manufacture an IC based on the IC layout. The process defines a set of design rules based on the specified manufacturing configuration. The process uses the set of design rules to design the IC layout.

Some embodiments of the invention provide a design aware process for manufacturing an integrated circuit ("IC"). The process receives an IC design with an associated set of design properties. The process specifies a manufacturing configuration that specifies a set of manufacturing settings for a set of machines to be used to manufacture the IC, where the specified set of manufacturing settings are based on the set of design properties. The process manufactures the IC based on the manufacturing settings.

In some embodiments, the set of design properties includes a set of characteristics of the design. In some embodiments, the set of design characteristics includes (1) a particular dimensional attribute for a set of elements for a particular layer of the IC layout, and/or (2) a particular amount of wiring in a particular direction on a particular layer, etc.

In some embodiments, the set of design properties includes a set of design rules. In some embodiments of the invention, the set of design rules specify a set of dimensional attributes of geometric elements of the IC layout. In some embodiments, these geometric elements can include modules, routes, vias, contacts, etc. The set of dimensional attributes of a geometric element can include the size, width, shape, rotation, orientation, spacing, density, distance and/or pitch in some embodiments.

In some embodiments, the set of manufacturing settings include the stepper lens configuration and type, the aperture setting, the exposure setting and/or the light wavelength setting for each layer of the IC.

BRIEF DESCRIPTION OF THE SEVERAL VIEWS OF THE DRAWINGS

The novel features of the invention are set forth in the appended claims. However, for purpose of explanation, several embodiments of the invention are set forth in the following figures.

FIG. 7 illustrates how a shorter wavelength reliably produces IC components than a longer wavelength.

FIG. 8 illustrates how a longer wavelength produces IC components than the shorter wavelength.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a manufacturing aware process for designing an integrated circuit ("IC") layout. The process receives a manufacturing configuration that specifies a set of manufacturing settings for a set of machines to be used to manufacture an IC based on the IC layout. The process defines a set of design rules based on the specified manufacturing configuration. The process uses the set of design rules to design the IC layout.

Some embodiments of the invention provide a design aware process for manufacturing an integrated circuit ("IC"). The process receives an IC design with an associated set of design properties. The process specifies a manufacturing configuration that specifies a set of manufacturing settings for a set of machines to be used to manufacture the IC, where the specified set of manufacturing settings are based on the set of design properties. The process manufactures the IC based on the manufacturing settings.

In some embodiments, the set of design properties includes a set of characteristics of the design. In some embodiments, the set of design characteristics includes (1) a particular dimensional attribute for a set of elements for a particular layer of the IC layout, and/or (2) a particular amount of wiring in a particular direction on a particular layer, etc.

In some embodiments, the set of design properties includes a set of design rules. In some embodiments of the invention, the set of design rules specify a set of dimensional attributes of geometric elements of the IC layout. In some embodiments, these geometric elements can include modules, routes, vias, contacts, etc. The set of dimensional attributes of a geometric element can include the size, width, shape, rotation, orientation, spacing, density, distance and/or pitch in some embodiments.

In some embodiments, the set of manufacturing settings include the stepper lens configuration and type, the aperture setting, the exposure setting and/or the light wavelength setting for each layer of the IC.

Before describing some embodiments of the invention in further details, an overview of a manufacturing aware design process is first described below in Section I. Various definitions for terms used in this application are described below in Section II. Next, a Design Aware Manufacturing ("DAM") process is described in Section III. Section IV then describes a Manufacturing Aware Design ("MAD") process. Finally, a computer system capable of implementing some embodiments of the invention is described in Section V.

I. OVERVIEW

Figure 1:
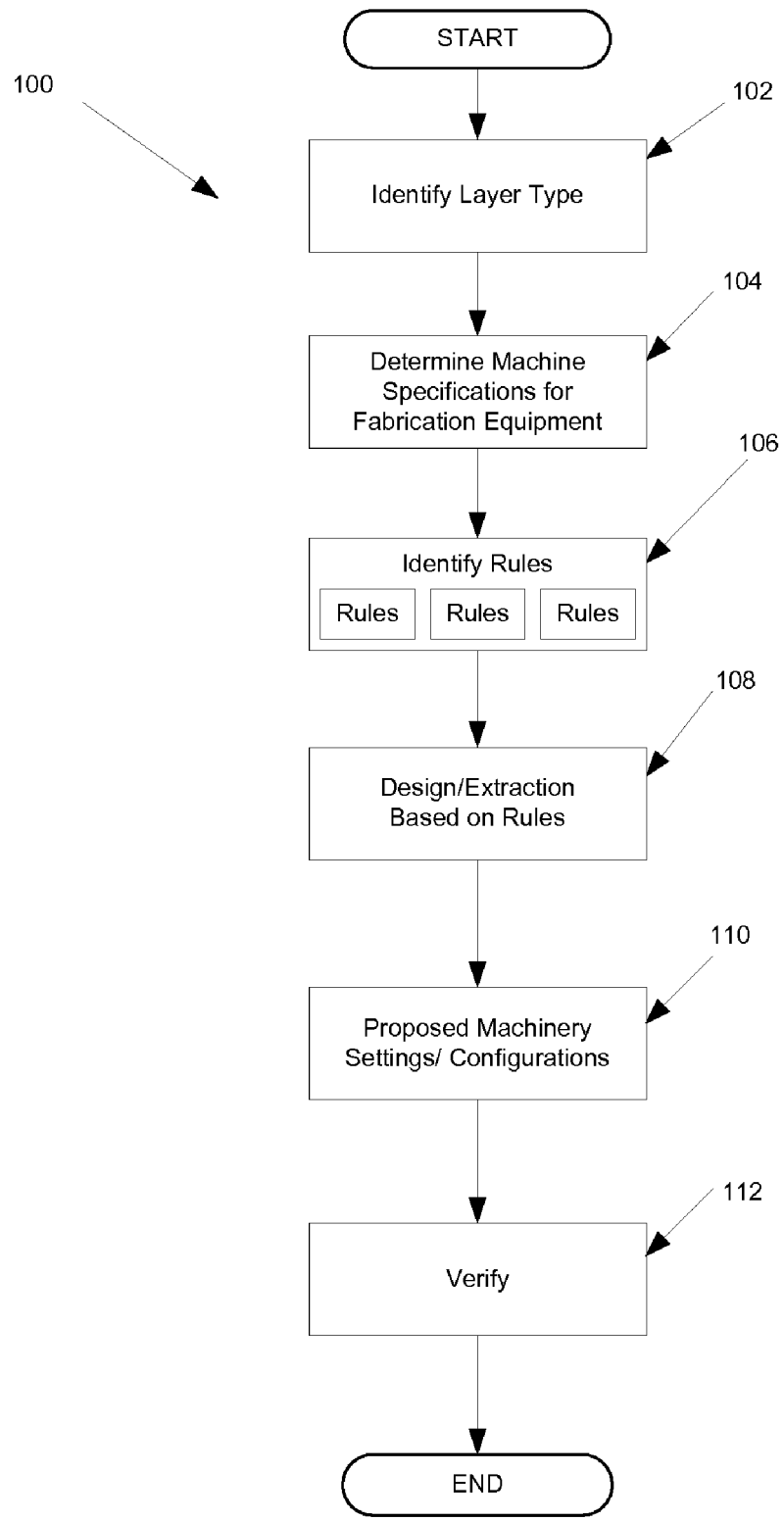
FIG. 1 illustrates a flow diagram that includes a design process.

FIG. 1 illustrates a flow diagram 100 that includes a design process. As shown in this figure, layer types can be identified (at 102). Identified layer types can be identified based on any individual and/or group of characteristics that are generally present and/or lacking on a particular layer of a circuit. Examples of layer types are as follows:

a high density of horizontal interconnection lines;
 a high density of diagonal interconnection lines;
 a high density of vertical interconnection lines;
 a high density of vias;
 a high density of horizontal and vertical interconnection lines, but only few diagonal interconnection lines;
 a dearth of vias;
 a dearth of horizontal interconnect lines;
 a dearth of components with a specific geometry.

In some embodiments, the identified layers can be based on any combination of geometric and/or electrical characteristics of physical components or any single geometric and/or electrical characteristic of a physical component.

At 104, machine specifications related to capabilities and limitations of specific configurations and/or settings on the fabrication equipment are determined. The determination of the capabilities can be based on (1) experimental results, (2) theoretical capabilities and/or limitations, (3) machine supplier/manufacturer specifications, and/or (4) any other known and/or convenient manner.

At 106, the machine specifications determined at 104 are converted into sets of rules 106. Each set of rules can be based on the determined capabilities and/or limitations of the manufacturing equipment given a specific configuration and/or setting. Each identified layer from 102 can then be matched with rules generated at 106 based upon the identified features of a layer and the determined characteristics of the settings of the fabrication machinery. For example, if a first layer is identified as having a high density of vertical interconnection lines and a particular setting/configuration of the fabrication machinery allows vertical lines to be more accurately printed at a closer spacing, the identified layer would be matched with the rules and machine settings/configuration associated with such settings/configurations. In some embodiments, the process of matching specific rules with identified layers can be made using any known and/or convenient system and/or method. In some embodiments, the number of identified layers can be limited to a predetermined quantity or can be unrestricted and/or the number of machine settings can be limited to a predetermined quantity of can be unrestricted.

At 108, the design and extraction of the circuit can be performed using identified rules and layer types. During the design and extraction process at 108, the system can optimize layers based on rules associated with specific machinery settings/configurations and identified layer types. The design and extraction can be performed using any known and/or convenient system and/or method.

Next, at 110, the design and extraction can be received with proposed settings/configurations of the fabrication machinery associated with each layer of the circuit, which are based on the machine specifications determined at 104.

At 112, the design and extraction can be verified to determine whether the proposed design and extraction will both function as desired and/or is within the capabilities of the fabrication foundry. If the provided design is verified, then it can proceed to production or if the design is not verified, it can be returned to the design process. If returned to the design process, specific regions within the circuit can be identified as problematic, specific design rules can be identified as problematic and/or specific machinery settings/configurations can be identified as problematic. The circuit can then be redesigned/extracted based on the updated information.

Figure 14:
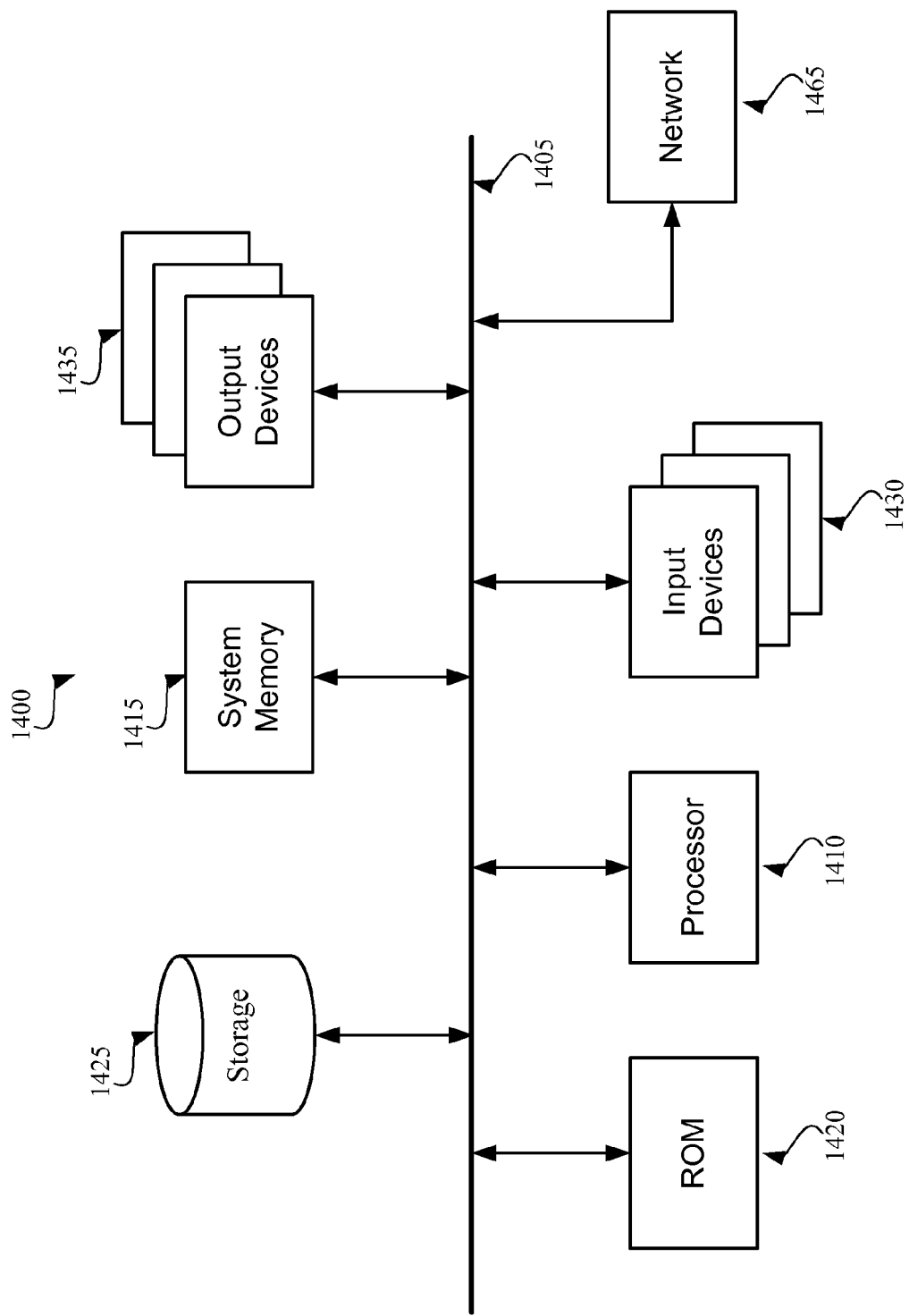
FIG. 14 conceptually illustrates a computer system with which some embodiments of the invention are implemented.

The execution of the sequences of instructions required to practice the embodiments may be performed by a computer system 1400 as shown in FIG. 14. In some embodiments, execution of the sequences of instructions is performed by a single computer system 1400. According to other embodiments, two or more computer systems 1400 may perform the sequence of instructions in coordination with one another. A description of computer system 1400 will be provided below in Section V. However, it should be understood that any number of computer systems 1400 may be employed to practice the embodiments.

In one embodiment, the design of the integrated circuit can be optimized to take advantage of specific machine settings and configurations for the manufacturing equipment. Therefore, if the specific type of fabrication equipment is known in advance, then the available settings for that equipment can be recognized and the design of the IC chip configured to utilize for those available settings.

II. DEFINITIONS

An integrated circuit ("IC") layout includes various geometric elements (also called geometric features). These elements are geometric representations of components of an IC. A geometric element of an IC layout can be a route, contact, module, vias, etc. Accordingly, these geometric elements may represent wires (i.e., interconnects), contacts, and/or blocks of an IC. Different geometric elements may have different attributes. In some embodiments, these attributes are dimensional attributes that define the size, width, shape, rotation, orientation, spacing, density, distance and/or pitch of one or more elements of the IC layout. In some embodiments, the attribute may define a relationship between two or more elements of the IC layout, such as the amount by which elements (e.g., vias, contacts) on different layers overlap with one another.

III. DESIGN AWARE MANUFACTURING PROCESS

Figure 2:
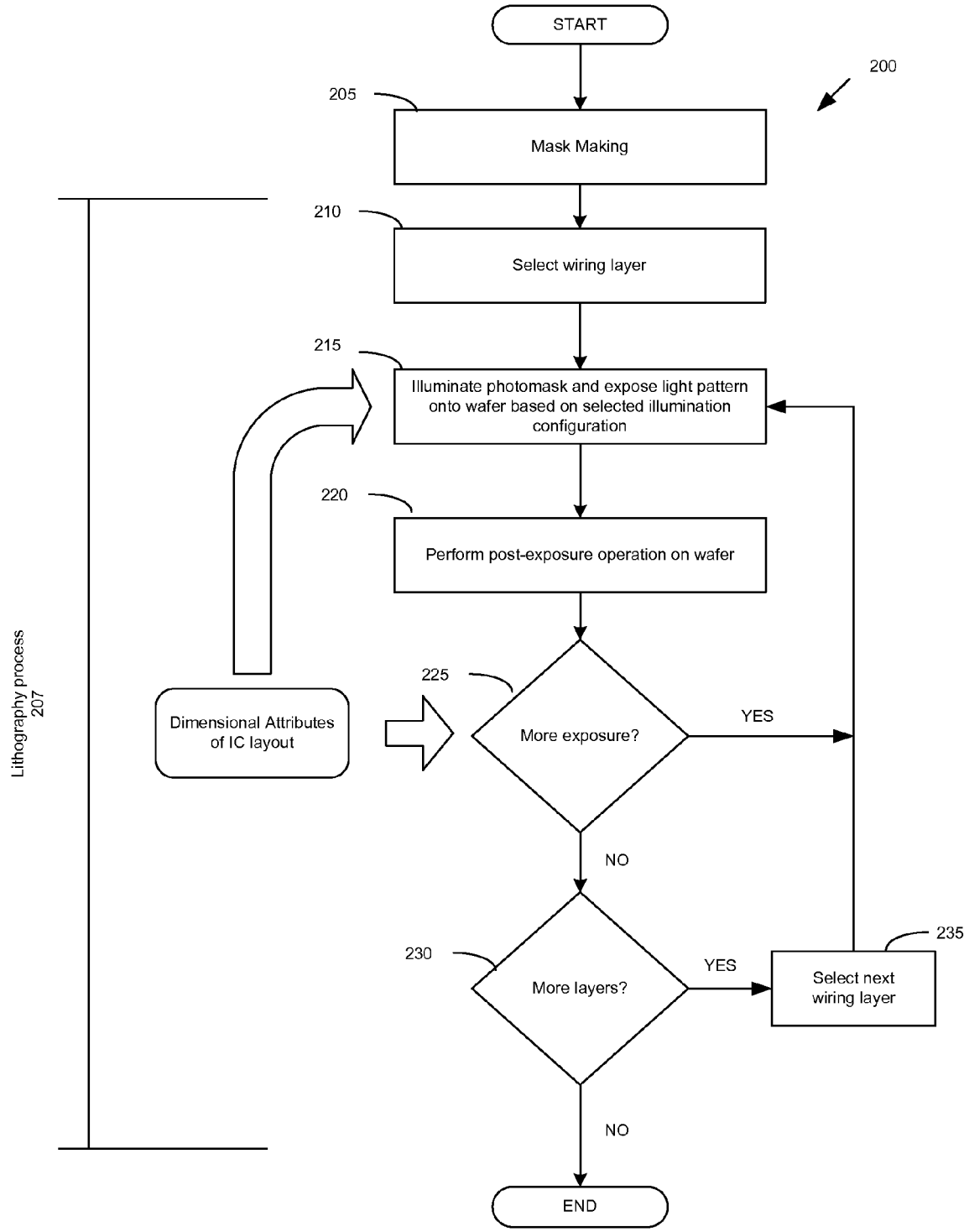
FIG. 2 illustrates a design aware manufacturing process that some embodiments use to create an IC.

FIG. 2 illustrates a design aware process 200 for manufacturing an IC. A mask making operation 205 is the initial operation of the manufacturing process 200. This mask making operation 205 creates one or more photolithographic masks for each layer of the designed layout of the IC. The mask defines certain components or interconnects of a layer of the IC. As such, for each particular layer, one or more masks are used to define the components or interconnect on that particular layer. Furthermore, each particular mask is based on a layer of the IC layout of a design operation.

As further shown in FIG. 2, a lithography process 207 follows the mask making operation 205 in the design aware manufacturing process 200, which is further described below.

A. Lithography Process

As shown in FIG. 2, a selection operation 210 is the first operation of the lithography process 207. The selection operation 210 selects a wiring layer of the IC layout. The operation that follows the selection operation 210 in the lithography process 207 is a design aware illumination operation 215. As shown in this figure, this operation is potentially a design aware operation (e.g., the illumination configuration/settings are based on the received design rules, and/or dimensional attributes of elements and/or characteristics of a layer of the IC layout). Design aware illumination operations are further described in Section III.B. The illumination operation 215 entails illuminating a mask, which exposes a light pattern onto a wafer. The illuminated mask defines certain components or interconnects of the IC on the selected layer.

After the illumination operation 215 of the lithography process 200, a post-exposure operation 220 is performed. Different embodiments perform different post-exposure operations. In some embodiments, the post-exposure operation 220 includes rinsing and etching operations. The rinsing operation entails rinsing away any area of a photoresist layer of the wafer that is exposed to the light pattern. This rinsing operation leaves an imprinted pattern of the mask on the photoresist layer of the wafer. Once the exposed area of the photoresist layer is rinsed away, an etching operation is performed on the wafer. During the etching operation, any area of the wafer that is unprotected by the photoresist layer is exposed to gases. The gases remove the exposed area of wafer, thereby producing the IC components of the desired circuit pattern.

The operation that follows the post-exposure operation 220 is an exposure determination operation 225. As shown in this figure, the exposure determination operation 225 can be potentially a design aware operation. The exposure determination operation 225 entails determining whether any additional exposure is required on the selected layer. If additional exposure is required, the next operation is the illumination operation 215, where another mask is illuminated based on the selected illumination configuration for the next exposure. For example, additional exposure is required if double dipole illumination is selected. If no additional exposure is required, then the next operation of the design aware lithography process 207 is a layer determination operation 230. In some embodiments, the design aware lithography process 207 does not include the exposure determination operation 225 and thus the next operation after the post-exposure operation 220 is the layer determination operation 230.

The layer determination operation 230 entails determining whether there is an additional layer that needs to be manufactured. If there is no additional layer, the design aware lithography process 207 ends. However, if there is an additional layer, the next operation is a layer selection operation 235. This operation entails selecting the next wiring layer. The illumination operation 215 follows the layer selection operation 235. As described above, this illumination operation 215 entails selecting an illumination configuration for the next wiring layer. In some embodiments, the design aware lithography process 207 does not include the layer determination operation 230.

In some embodiments, the design aware lithography process 207 is performed by using multiple machines of a production line manufacturing process used to create each layer of all the ICs. In this process, each machine of the production line has a particular illumination configuration (e.g., particular stepper lens). This production line manufacturing process is dedicated to manufacturing only one layer of all ICs that are produced by using this production line. Some embodiments perform the lithography process 200 by using a production line manufacturing process that includes one or more machines that are modified during the manufacturing process (e.g., by changing the individual stepper lens).

B. Illumination Machine Configuration/Settings

An illumination machine configuration is an arrangement of illumination components that can perform an illumination operation. These illumination components may include manufacturing settings. During a lithography process, these manufacturing settings can be specified. Different embodiments may specify different manufacturing settings. As previously mentioned, during a design aware manufacturing process, the manufacturing settings may be specified based on the set of design rules, and/or dimensional attributes of elements and/or design characteristics of the IC layout.

i. Illumination Configuration

Figure 3:
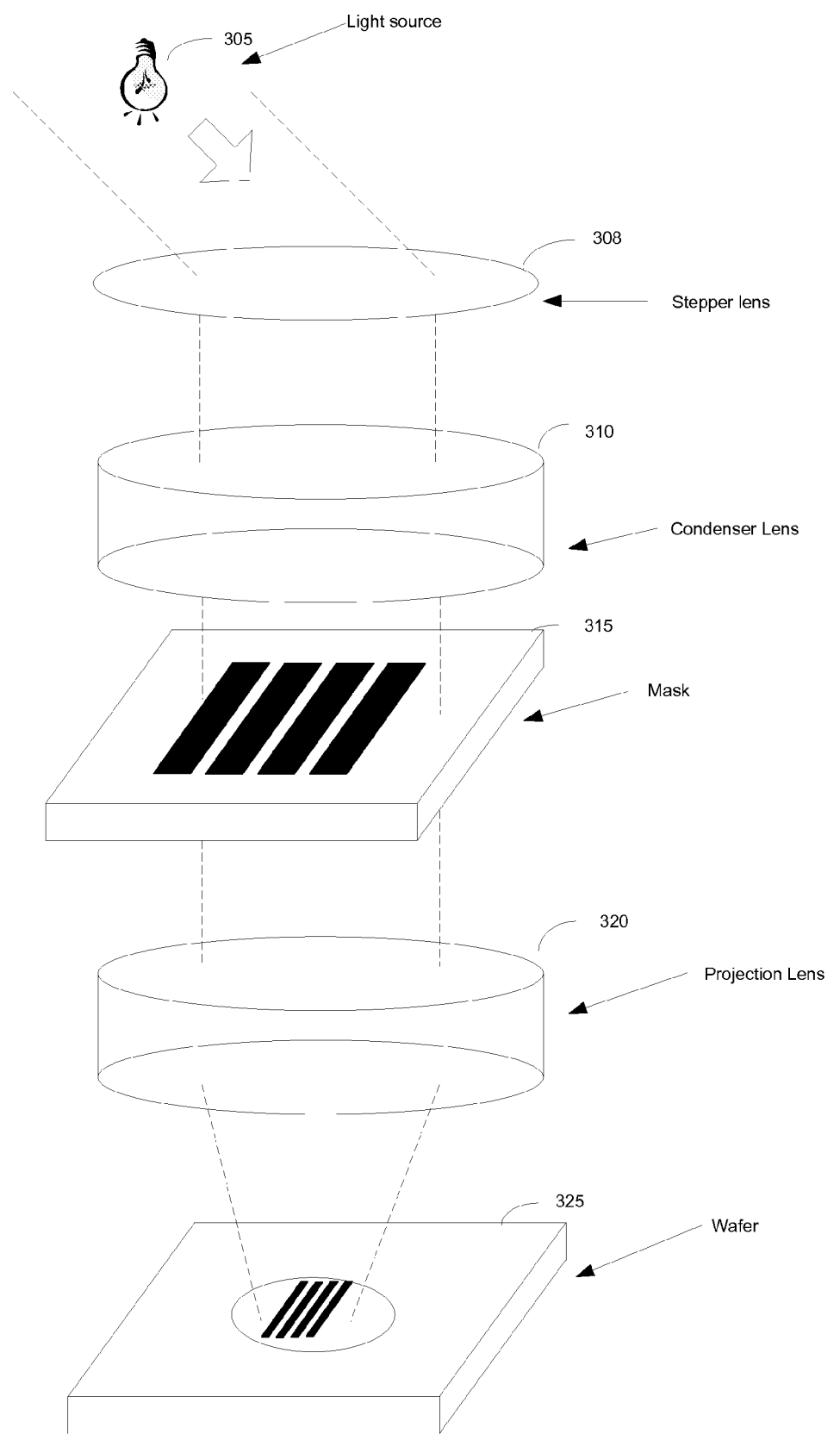
FIG. 3 illustrates an example of an illumination configuration that is used to perform an illumination operation during the manufacturing process described above

FIG. 3 illustrates an example of an illumination configuration that is used to perform an illumination operation 215 during the lithography process 207 described above. This illumination configuration includes a light source 305, a stepper lens 308, a condenser lens 310, a mask 315, a projection lens 320 and a wafer 325.

The light source 305 is part of an illuminator in the illumination configuration illustrated in FIG. 3. The light source provides the light that shines on the mask 315. The illuminator can be configured with various settings. In some embodiments, these settings specify how light is shined on the mask 315. The light source 305 may have an aperture setting, which specifies the portion of the lens from which the light passes through.

Figure 4:
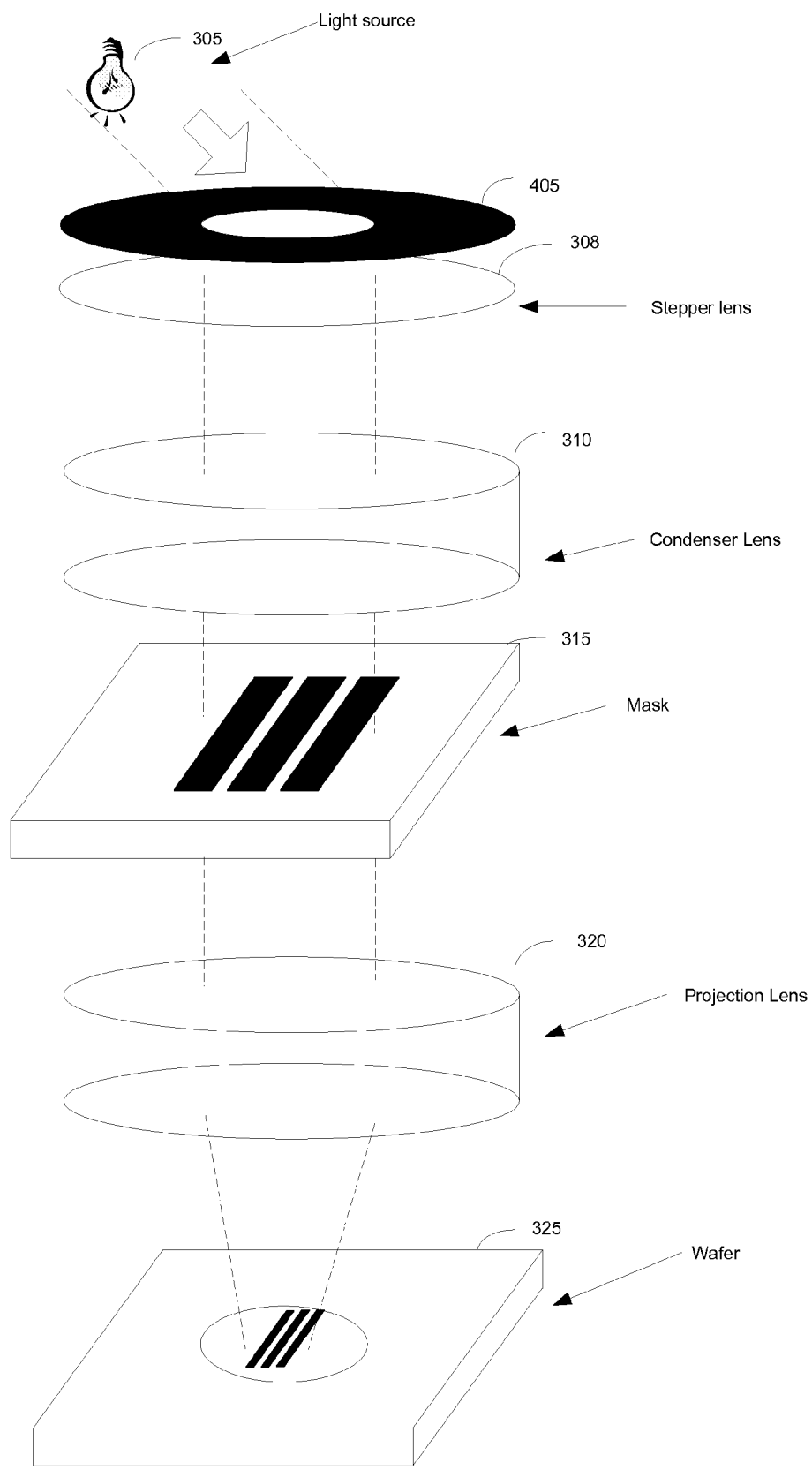
FIG. 4 illustrates an example of an illumination configuration with an aperture mask that is used to perform an illumination operation during the manufacturing process described above

As shown in FIG. 4, an aperture mask 405 may be used to specify the portion of lens that is used to shine light in some embodiments. As shown in FIG. 4, the aperture mask 405 includes a hole through which the light passes through. Some embodiments position the aperture mask 405 before the stepper lens 308, other embodiments position the aperture mask 405 at different positions, while other embodiments might not utilize an aperture mask and instead simply use the optical properties of the stepper lens to achieve the desired optical effects. Although the aperture mask 405 and stepper lens 308 are described as two separate components in the illumination configuration, in some embodiments, the aperture mask 405 and stepper lens 308 may be one component in the illumination configuration. Also, the light source, aperture mask, and the stepper lens form the illuminator of some embodiments. Other embodiments may use other well-known techniques to control aperture during an illumination process.

As shown in FIG. 3, the light source 305 is shifted away from a normal incidence. When the light source 305 is shifted in such a manner, the light coming from the light source 305 strikes a lens at an angle away from normal incidence (i.e., striking the lens away from a perpendicular angle). In this configuration, the particular lens is the stepper lens 308. The function of the stepper lens 308 in this configuration is to shape the light pattern that strikes the mask 315. Additionally, the stepper lens 308 reduces the light pattern sensitivity to lens aberrations, such as image placement error.

Once the light passes through the stepper lens 308, it passes through a condenser lens 310. The condenser lens 310 focuses the light through the mask 315. Any light that passes through the mask 315 creates a light pattern. The light pattern then passes through a projection lens 320. This passing focuses the light and reduces the light by a factor (e.g., four). The focused and reduced light pattern then projects onto a wafer 325.

The configuration illustrated in FIG. 3 is referred to as an off-axis illumination configuration. The term "off-axis" refers to when the light source 305 is shifted away from normal incidence. However, one skilled in the art will realize that different embodiments may use different illumination configurations with different components. Also, different embodiments may use different settings for the components of the illumination configuration.

ii. Illumination Settings

As mentioned above, one possible setting for the lithography machine is the aperture of the light source, which can be specified by using an aperture mask. In some embodiments, the bigger the size of the hole of the aperture mask, the more light passes through the lens for a given period of time, and vice-versa. In other words, specifying the aperture of the light source specifies how much light illuminates the mask 315. In some embodiments, a large aperture means light passes through a small hole, while a small aperture means light passes through a large hole. Typically, a large aperture (small hole) provides bigger depth of focus than a smaller aperture (larger hole). In some embodiments, an illumination setting with bigger depth of focus produces components with less precision than an illumination setting with a smaller depth of focus.

Figure 5:
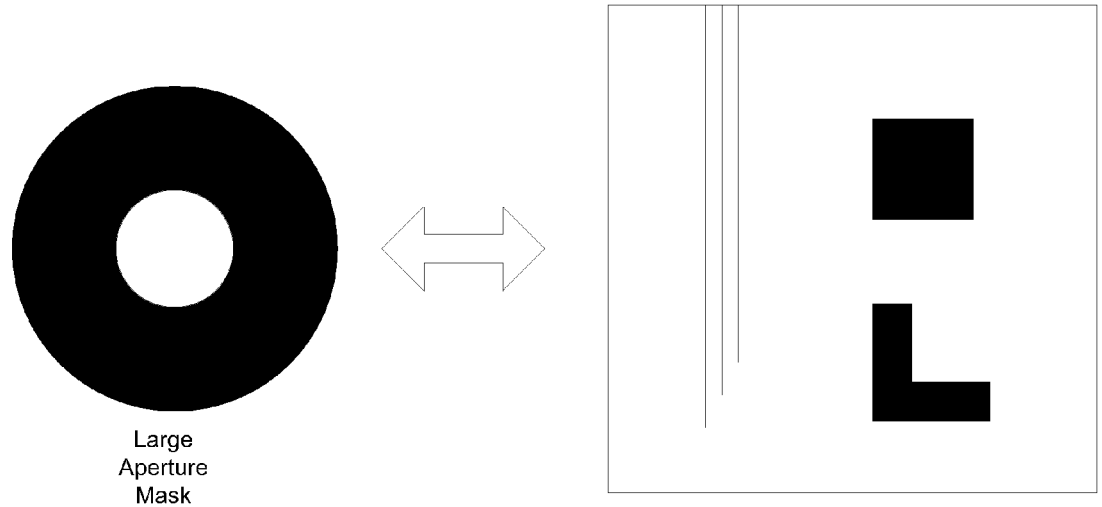
FIG. 5 illustrates how components of the IC may be produced under an aperture setting.
Figure 6:
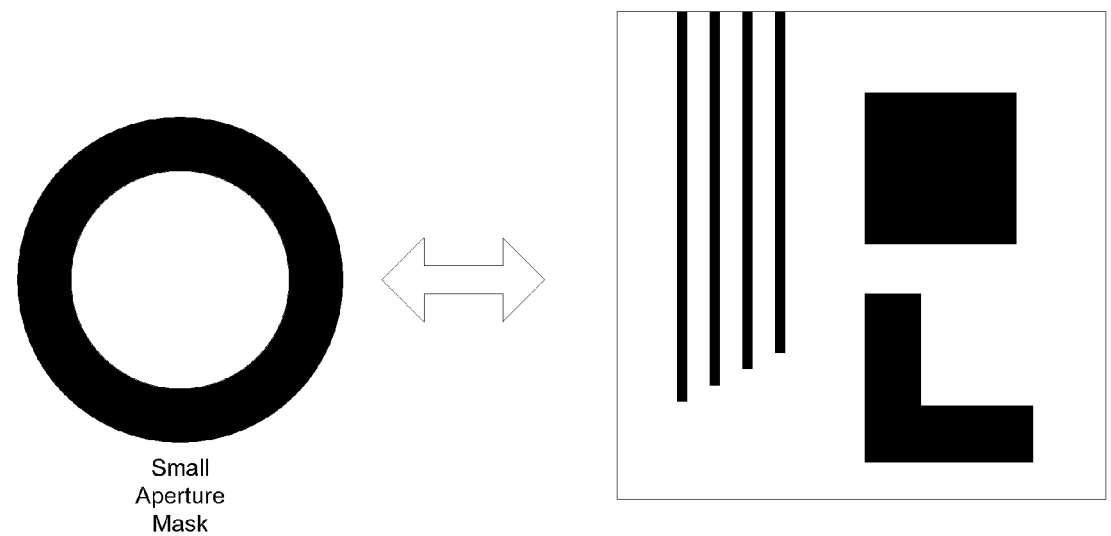
FIG. 6 illustrates how components of the IC may be produced under another aperture setting.

FIGS. 5-6 illustrate how components of the IC may be produced under different aperture settings. As shown in FIG. 5, a large aperture produces components (e.g., contact) of the IC with more precision (i.e., less variation from the intended design). Thus, when small dimensional attributes (e.g., width, spacing, pitch, density) are specified for elements of a layer of the IC layout, a design aware manufacturing process may specify a large aperture as a possible manufacturing setting for a lithography machine.

Conversely, as shown in FIG. 6, a small aperture produces components with less precision (i.e., produced components have bigger variations from the intended design). Accordingly, a small aperture should only be used to produce components with relatively big dimensional attributes in some embodiments. Thus, when big dimensional attributes are specified for elements of a layer of the IC layout, a design aware manufacturing process may specify a small aperture as a possible manufacturing setting for a lithography machine, since the larger sized components of the IC can tolerate bigger variations in the design.

Another possible setting for the light source 305 is the length of time that the light source 305 illuminates the mask. In some embodiments, this length of time is referred to as nominal exposure. Typically, the more light that is shined on the mask 315, the less time is required for the light source 305 to illuminate the mask 315. For a particular illumination configuration and/or setting, there is an optimal nominal exposure that minimizes variations in the produced components of the IC. In some embodiments, a specified nominal exposure that is farther away from the optimal nominal exposure produces small components of the IC with less precision than a nominal exposure that is closer to the optimal nominal exposure.

In some embodiments, the relationship between nominal exposure and aperture is inversely proportional. That is, the larger the aperture, the shorter the nominal exposure, and vice-versa.

In addition to using different combinations of aperture and nominal exposure, some embodiments may specify illuminating the mask 315 with light that has different wavelengths. As shown in FIGS. 7-8, shorter wavelengths produce smaller IC components with more precision than longer wavelengths. Thus, when small dimensional attributes are specified for elements of a layer of the IC layout, a design aware manufacturing process may specify shorter light wavelengths as a potential manufacturing setting. When big dimensional attributes are specified for elements of a layer of the IC layout, a design aware manufacturing may specify a longer light wavelength as a potential manufacturing setting.

In addition to specifying the exposure and the wavelength settings for the light source, the settings (e.g., type, size) of a stepper lens may also be specified. In some embodiments, specifying the settings of a stepper lens allow the manufacturing process to take advantage of a stepper lens' ability to produce IC components along certain directions of the IC with more precision.

Figure 9A:
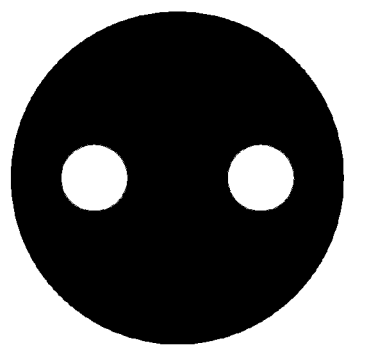
FIG. 9 illustrates how stepper lenses may produce an IC.
Figure 9A:
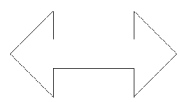
Figure 9A:
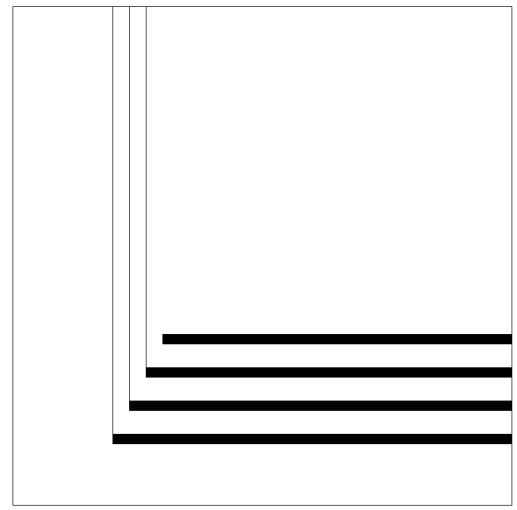
Figure 9B:
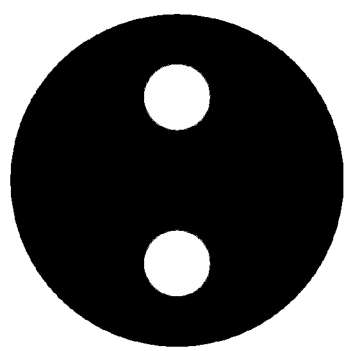
Figure 9B:
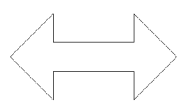
Figure 9B:
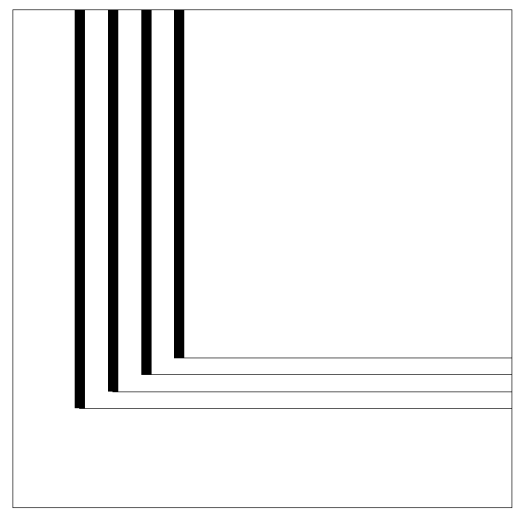

FIGS. 9A and 9B illustrate how different stepper lenses may produce ICs differently. As shown in both these figures, a vertically aligned stepper lens produces IC components along the horizontal direction with more precision, while a horizontally aligned stepper lens produces IC components along the vertical direction with more precision. In some embodiments, a 45 degree aligned stepper lens produces IC components along the 135 degree direction with more precision, while a 135 degree aligned stepper lens produces components of the IC along the 45 degree direction with more precision.

Figure 10:
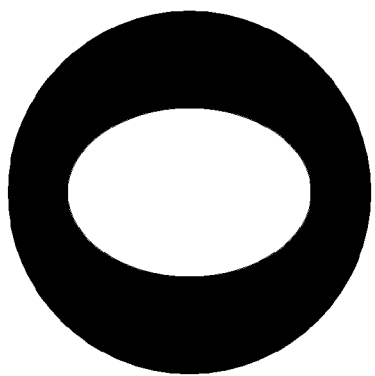
FIG. 10 illustrates how another stepper lens may produces an IC.
Figure 10:
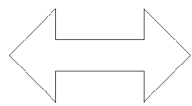
Figure 10:
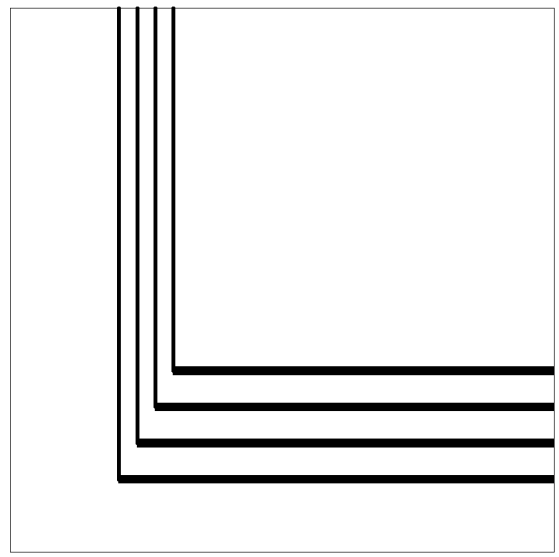

FIG. 10 illustrates the use of another stepper lens. Specifically, this figure illustrates the use of a modified annular lens. In some embodiments, the modified annular lens approximates a horizontally aligned dipole lens. However, the modified annular lens is not as effective as the horizontally aligned dipole lens. Accordingly, the modified annular lens produces small dimensional attributes along the vertical direction with less precision than the horizontally aligned dipole lens. U.S. patent application Ser. No. 11/214,472, filed Aug. 28, 2005, entitled "Manufacturing Aware Design and Design Aware Manufacturing," further describes the use of other stepper lenses (e.g., quadrupole stepper lenses). This application is incorporated hereinafter by reference.

When the IC design specifies small dimensional attributes along the vertical direction of the layer, some embodiments specify the use of a horizontally aligned stepper lens in a machine. Additionally, some embodiments specify the use of a vertically aligned stepper lens in a machine when the IC design specifies small dimensional attributes along the horizontal direction of the layer of the IC layout.

The dipole, annular, and other properties (e.g., quadrupole) of stepper lenses may be built into these lenses, or as described above, may be achieved by placing aperture masks with dipole, annular, and other aperture (e.g., quadrupole) arrangements next to the stepper lenses. Alternatively, some embodiments may use pole arrangements of both an aperture mask and a stepper lens to achieve a desired optical effect.

Some of the illumination configuration and operation mentioned above utilize various stepper lenses. However, other embodiments do not use a stepper lens in an illumination configuration that performs an illumination operation 215 during the lithography process 207.

Figure 11:
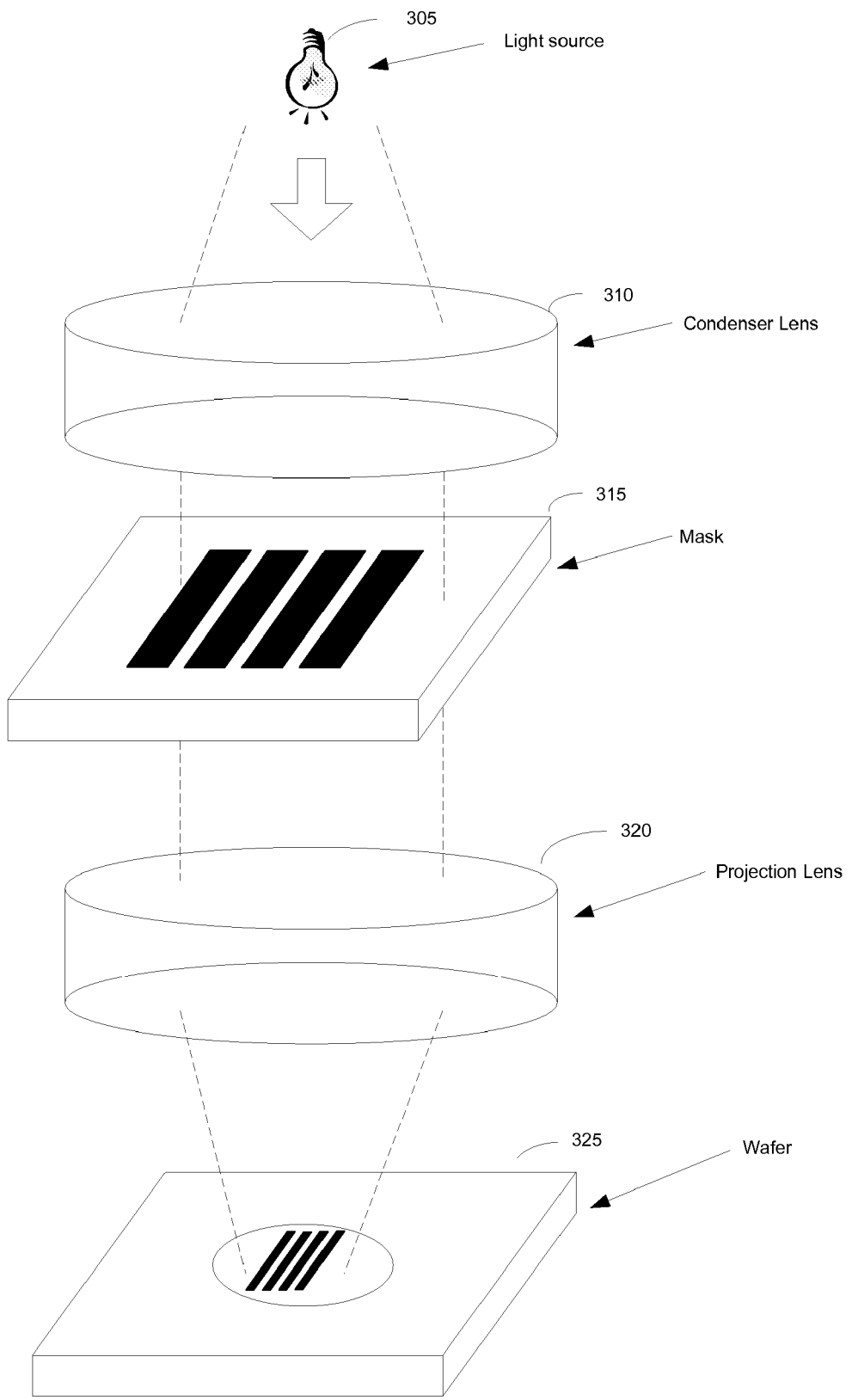
FIG. 11 illustrates an example of a configuration that does not include a stepper lens.

FIG. 11 illustrates an example of such a configuration that does not include a stepper lens. In this illumination configuration, the light source 305 is not shifted away from a normal incidence. As such, the light coming from the light source 305 light shines at near normal incidence. When the light coming from the illuminator shines at near normal incidence, the light strikes the surface of a lens at a perpendicular angle. In this instance, the lens is the condenser lens 310. When the light shines at near normal incidence and no stepper lens is included in this illumination configuration, the illumination operation 215 is typically referred to as on-axis illumination.

The above-mentioned illumination configuration/settings can be manually set for each particular layer. For instance, when illuminating a mask for a particular layer, a technician can insert the appropriate stepper lens for the particular layer in an otherwise fixed illumination configuration. Alternatively, the illumination configuration can be automatically set for each particular layer. For example, when illuminating a mask for a particular layer, an automated machine can insert the appropriate stepper lens for the particular layer. In addition, or in lieu of configurating the stepper lens, some embodiments, may also specify other manufacturing settings of the lithography process, such as aperture, nominal exposure, wavelength, etc.

In some embodiments, the manufacturing process 200 does not require a mask (i.e., maskless manufacturing process). Thus, in some embodiments the manufacturing process 200 does not perform the mask making operation 215 when a mask is not required. A Deep-Ultraviolet lithography ("DUVL") process and an Extreme-Ultraviolet lithography ("EUVL") process are examples of manufacturing processes that might not require a mask. These manufacturing processes might not require a mask because the wavelength of the light that illuminates the wafer is typically smaller than the size of the IC components.

In the above description, the manufacturing settings are described as based on the set of design rules that are used to define an IC layout. However, in some embodiments, identical set of design rules may define design characteristics for different layers of the IC layout (e.g., one layer is 95% horizontal lines and another layer is 95% vertical lines). In such instances, the manufacturing settings are based on the set of design characteristics of the IC layout in some embodiments. In other words, the manufacturing settings look at the end results of the IC design to determine the settings to be used on the machines in some embodiments.

Moreover, the above-mentioned illumination configurations are described by reference to various components that each performs a particular function. One of ordinary skill in the art will realize that some of these components can be swapped and/or some of the functionalities can be merged in some embodiments. For example, the functionalities provided by the stepper lens and aperture mask may be replaced by a diffraction grading optical device that produces the same optical effects as the stepper lens and aperture mask. Additionally, some of these lenses may be replaced with mirrors or a combination of lenses and mirrors may be used.

Furthermore, some or all of these components and their functionalities may be embodied as one optical device. Moreover, these components may be configured in different order in the machine.

IV. MANUFACTURING AWARE DESIGN

A. Overview

Figure 12:
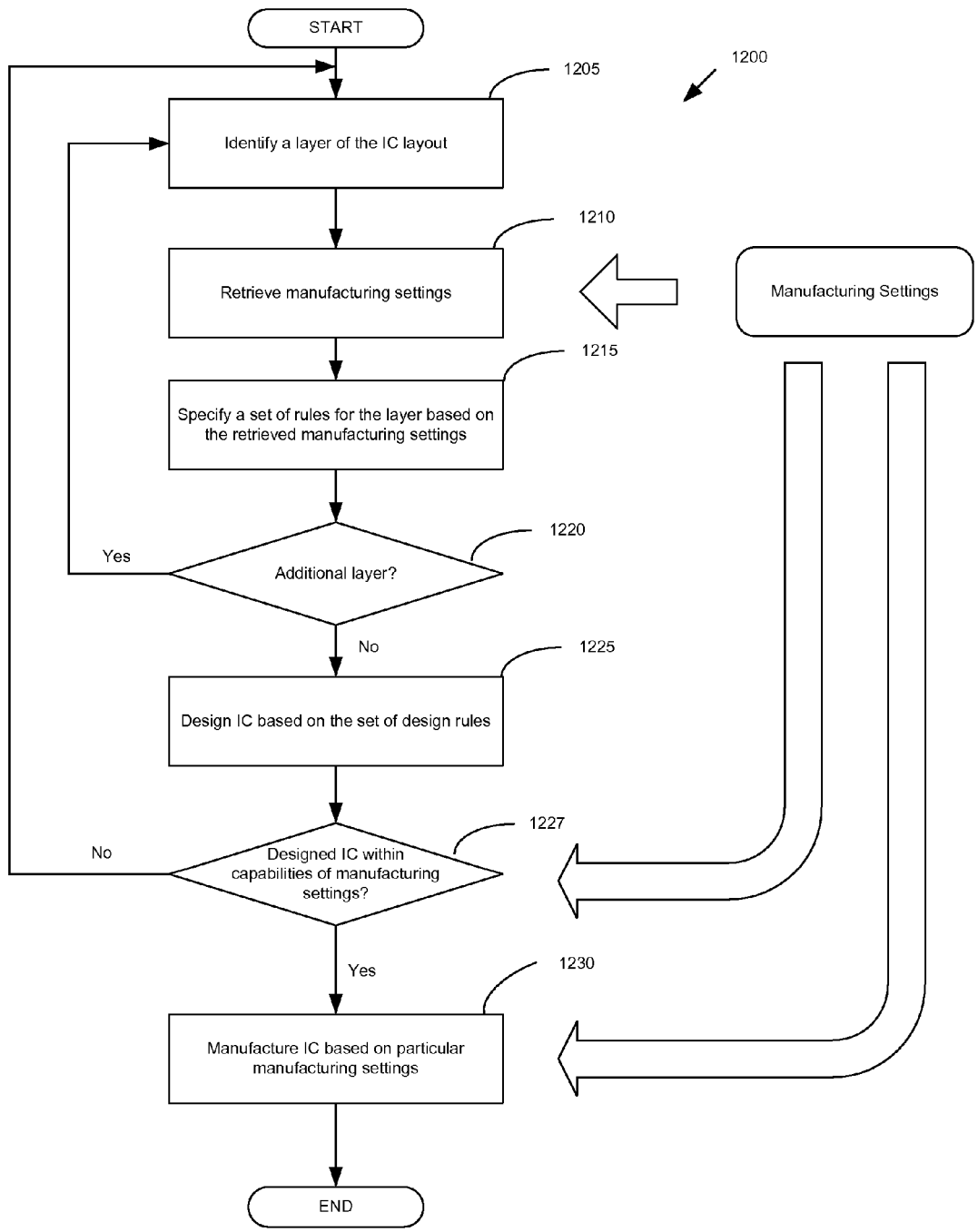
FIG. 12 illustrates a process for designing and manufacturing an IC that includes a manufacturing aware design process.

Some embodiments provide a process for designing and manufacturing an IC. In some embodiments, the design process is a manufacturing aware design process. FIG. 12 conceptually illustrates an example of a process 1200 that includes a manufacturing aware design process. As shown in this figure, a layer of the IC layout is identified (at 1205) during the process 1200. Next, a set of manufacturing settings is retrieved (at 1210). In some embodiments, these settings are retrieved from a database. The manufacturing settings specify how the IC can be manufactured. In some embodiments, the manufacturing settings can be the fabrication technology, the type of light wavelength used, the type and/or size of the stepper lens, the aperture of the illuminator, the nominal exposure, etc. In some embodiments, the retrieved manufacturing settings are the settings that are going to be used to manufacture an IC based on the IC layout that is going to be designed. The manufacturing settings/configurations can be based on (1) experimental results, (2) theoretical capabilities and/or limitations, (3) machine supplier/manufacturer specifications and/or (4) any other known manner in some embodiments.

Based on these retrieved manufacturing settings, a set of design rules is specified (at 1215) for the identified layer. In some embodiments, the set of design rules define how elements (e.g., modules, vias, contact, routes) of the IC layout are designed for a particular layer.

In some embodiments, specifying the set of design rules includes defining the minimum width and/or minimum spacing for routes along different directions on at least one particular layer of the IC layout. In some embodiments, specifying the set of rules includes specifying the minimum size of modules, vias and/or contacts of the IC layout. Furthermore, in some embodiments, this specification entails selecting the minimum width and/or minimum spacing of routes along different directions on each particular layer of the IC layout. In some embodiments, specifying the set of design rules includes specifying the density of elements on one or more layer of the IC layout.

For example, as shown in FIG. 5, when the manufacturing setting specifies a large aperture, the set of design rules may specify the use of small dimensional attributes for the elements. In contrast, when the manufacturing settings specify a small aperture, the set of design rules may specify the use of larger dimensional attributes for the elements, as shown in FIG. 6.

Additionally, the use of different light wavelength may specify different dimensional attributes for elements of an IC layout, as shown in FIGS. 7 and 8. Specifically, when a short wavelength is specified, some embodiments may specify small dimensional attributes, while specifying larger dimensional attributes when a long wavelength is specified.

Similarly, when a horizontally aligned stepper lens is specified, small dimensional attributes of elements may be specified along the vertical direction by the set of design rules, while larger dimensional attributes may be specified along the horizontal direction, as shown in FIG. 9. Additionally, when a vertically aligned stepper lens is specified, small dimensional attributes of elements may be specified along the horizontal direction by the set of design rules, while larger dimensional attributes may be specified along the vertical direction.

In some embodiments, these set of design rules are stored in one or more data structures or data storages (e.g., design files). One example of such a storage is a Library Exchange Format/Design Exchange Format ("LEF/DEF") design file that stores the dimensional attributes (e.g., width, spacing) of the routes for use by an EDA tool, such as a placer and a router. Another example is a rule deck file that can be used by a design rule checker ("DRC") to perform a design rule checking operation. Another example of storage is a rule deck file (e.g., Layout Versus Schematic ("LVS") file, parasitic extraction ("RCX") file) that can be used during an extraction operation. The use of such design files will be further described below by reference to FIG. 13.

The next operation of the process 1200 is determining (at 1220) whether there is an additional layer to identify. If so, the process 1200 proceeds back to 1205 to identify another layer. While some embodiments specify different sets of rule for each layer of the IC layout, other embodiments may specify one set of rules for some or all layers of the IC layout.

Once it is determined (at 1220) there is no additional layer, the next operation of the process 1200 is a design operation 1225. The design operation 1225 entails designing the layout of the IC based on the set of rules that were specified at 1215 (e.g., minimum width and/or minimum spacing of the routes). As mentioned above, some embodiments might perform the design operation 1225 based on at least one design file (e.g., LEF/DEF file, rule deck file), which contains the dimensional attributes that indicate the specified minimum width and/or minimum spacing of the routes and/or size of the modules for at least one layer of the IC layout. This design operation 1225 will be further described below by reference to FIG. 13.

In some embodiments, verification operation 1227 follows the design operation 1225. During this operation, the process 1200 determines whether the design IC can be manufactured within the capabilities of the manufacturing process (by fab).

If not, the process proceeds to 1205. Although in some embodiments, the process 1200 may proceed to 1225 to redesign the IC layout. This redesign may include redesigning the entire IC layout or only a portion (e.g., one layer) of the IC layout. If the designed IC is verified as within the capabilities of the manufacturing process, the process 1200 proceeds to a manufacturing operation 1230 and ends.

In some embodiments, the manufacturing operation 1230 entails manufacturing the IC based on the IC layout that was designed during the design operation 1225. The manufacturing operation 1230 uses the manufacturing settings that were received at 1210 to manufacture the IC. In some embodiments, this manufacturing operation is the design aware manufacturing operation 200.

In the above design and manufacturing process 1200, the design process is referred to a manufacturing aware design ("MAD") process because the design process takes into account manufacturing settings/capabilities.

The above design and manufacturing processes describe using specified manufacturing settings. However, the manufacturing settings that are actually used by the machines (e.g., lithography machine) to produce the IC may be different than those specified in some embodiments.

B. Designing Integrated Circuits

Figure 13:
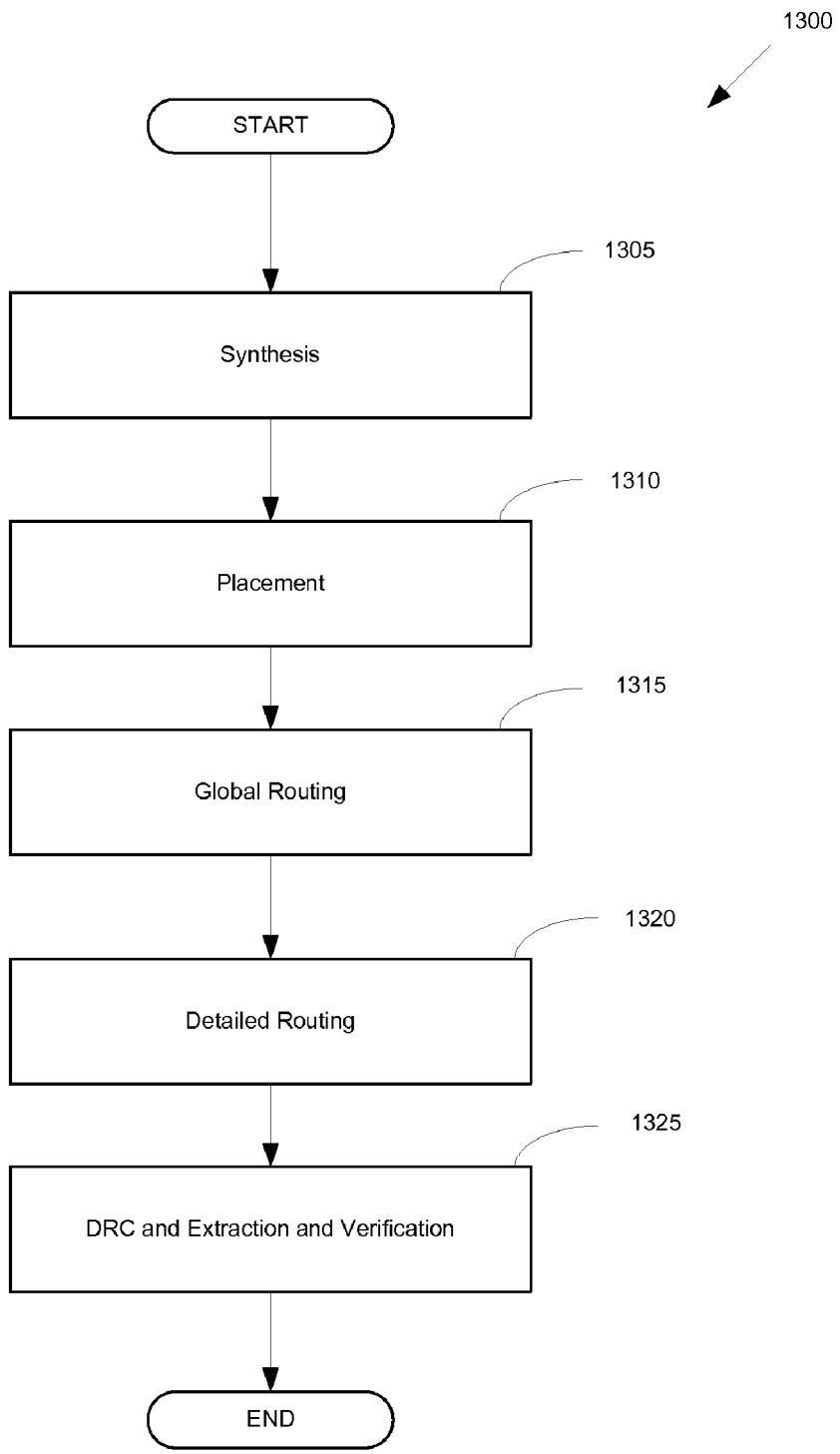
FIG. 13 illustrates a process 1300 for designing an IC

FIG. 13 illustrates a process 1300 for designing an IC. As shown in this figure, the initial operation of the process 1300 is a synthesis operation 1305. This operation develops a circuit representation of the IC based on a logical representation of the IC. The logical representation provides a behavioral description of the IC (i.e. description of the functions(s) of the IC), while the circuit representation provides a circuit description of the IC. The circuit description is typically provided in terms of circuit elements, such as cells, macros, gates, transistors and interconnection between these elements.

As further shown in FIG. 13, the operation after the synthesis operation in the process 1300 is a placement operation 1310. This placement operation converts the circuit representation of the IC into a geometric representation. The geometric representation is called a layout. The layout is created by converting the circuit elements specified during the synthesis operation into geometries. A placer performs a placement operation. Specifically, the placer identifies the position of geometries (e.g., circuit modules geometries) on the layout. In some embodiments, the goal of the placer is to position the geometries on the layout in view of certain objective functions or design criteria, such as occupying a minimum area. In some embodiments, the placer performs this operation based on information contained in the design file (e.g., LEF/DEF file), which contains information regarding the physical design of the IC.

As further shown in FIG. 13, the operation after the placement operation 1310 in the process 1300 is a global routing operation 1315. The global routing operation 1315 is performed after the placer has positioned the geometries on the layout. A router performs the global routing operation 1315. During the global routing operation 1315, the router specifies different regions in the routing space through which a wire should be routed. In some embodiments, the router completes the connection between blocks of the circuit, while disregarding the exact geometric details of each wire or pin.

As shown in FIG. 13, the detailed routing operation 1320 follows the global routing operation 1315. A router also performs the detailed routing operation 1320. In some embodiments, the router defines routes that connect the routable elements (e.g., pins) of nets in the layout. The router defines such a route in view of certain objective functions or design criteria, such as minimizing wirelength, minimizing congestion, etc. As previously mentioned, in some embodiments, the router performs this detailed routing operation 1320 based on information contained in the design file (e.g., LEF/DEF file).

To facilitate the creation of the routes with different widths in different directions on the same layer, some embodiments adaptively define the shape of interconnect-line ends (i.e., the shape of the route-segment ends) on a particular layer based on the routing directions available on the particular layer. By so defining these shapes, these embodiments improve the alignment of route segments that have differing widths. In other words, dynamically defining the interconnect-line ends improves the shape of a route at bends along which the route transitions from one width to another.

Also, to facilitate the creation of routes with different widths and/or spacing in different directions on a particular layer, some embodiments define, for each available routing direction on the particular layer, an "unroutable" bloated region about a previously defined geometry (e.g., a previously defined obstacle, wire, or via pad) on the particular layer. An item's bloated region for a particular routing direction specifies the portion of the particular layer that is not available for route segments along the particular routing direction. The item's bloated region for a particular direction is derived based on the minimum spacing required between the item and any route segment in the particular direction for the particular net.

These embodiments then use the bloated regions to figure out which portion of the layout is not available for routing. For instance, some embodiments perform one or more path searches to identify a route for a net. In these embodiments, a path search identifies a path from a source set of grid points to a target set of grid points by iteratively identifying path expansions, where each expansion is from a start grid point to a destination grid point. For each path expansion that goes from a particular start point to a particular destination point along a particular direction, these embodiments determine whether the destination point falls within the bloated region of the particular direction. If so, the destination point is not a valid destination point and the path expansion is not a valid expansion.

This and other routing operations are described in detail in U.S. patent application Ser. No. 10/229,202, filed Aug. 26, 2002, entitled "LAYOUTS WITH ROUTES WITH DIFFERENT WIDTHS IN DIFFERENT DIRECTIONS ON THE SAME LAYER, AND METHOD AND APPARATUS FOR GENERATING SUCH LAYOUTS" and U.S. patent application Ser. No. 10/751,332 filed Jan. 2, 2004, entitled "METHOD AND APPARATUS FOR ROUTING". These patent applications are incorporated herein by reference.

As shown in FIG. 13, the design rule checking and extraction-verification operations 1325 follow the detailed routing operation 1320 in the process 1300. In some embodiments, the design rule checking operation is performed by a design rule checker ("DRC"). The DRC verifies that all geometries on the layout meet certain design rules (e.g., dimensional attributes of routes). For instance, the DRC may check that the separation between wires is consistent with the specified designs. The DRC may also check that the width and/or spacing of the routes meet the design rules. In some embodiments, these design rules are located in a design file (e.g., rule deck file). In some embodiments, these design rules are defined during the selection (at 1210) of process 1200. Once the DRC has verified that all the design rules are met, some embodiments extract resistance and capacitance information from the layout, and use the extracted information to verify that the design of the IC meets certain operational requirements. The extracted information can be verified by comparing them to a design file (e.g., LVS file, RCX file). In some embodiments, these requirements include performance objectives and physical constraints. For example, the information that is extracted is used to verify the functionality of the layout (i.e., to verify that the circuit performs as designed).

Some embodiments might perform several iterations of the synthesis, placement, global routing, detailed routing, DRC and extraction-verification operations in order to design the IC. These iterations might be performed within each operation and/or between different operations. During these iterations, various configurations and designs are specified by the synthesis, placement, global routing, detailed routing, DRC and extraction-verification operations in order to achieve an optimal IC design.

V. COMPUTER SYSTEM

FIG. 14 conceptually illustrates a computer system with which some embodiments of the invention are implemented. The computer system 1400 includes a bus 1405, a processor 1410, a system memory 1415, a read-only memory 1420, a permanent storage device 1425, input devices 1430, and output devices 1435.

The bus 1405 collectively represents all system, peripheral, and chipset buses that support communication among internal devices of the computer system 1400. For instance, the bus 1405 communicatively connects the processor 1410 with the read-only memory 1420, the system memory 1415, and the permanent storage device 1425.

From these various memory units, the processor 1410 retrieves instructions to execute and data to process in order to execute the processes of the invention. The read-only-memory ("ROM") 1420 stores static data and instructions that are needed by the processor 1410 and other modules of the computer system. The permanent storage device 1425, on the other hand, is a read-and-write memory device. This device is a non-volatile memory unit that stores instruction and data even when the computer system 1400 is off. Some embodiments of the invention use a mass-storage device (such as a magnetic or optical disk and its corresponding disk drive) as the permanent storage device 1425. Other embodiments use a removable storage device (such as a floppy disk or Zip® disk, and its corresponding disk drive) as the permanent storage device.

Like the permanent storage device 1425, the system memory 1415 is a read-and-write memory device. However, unlike storage device 1425, the system memory is a volatile read-and-write memory, such as a random access memory. The system memory stores some of the instructions and data that the processor needs at runtime. In some embodiments, the invention's processes are stored in the system memory 1415, the permanent storage device 1425, and/or the read-only memory 1420.

The bus 1405 also connects to the input and output devices 1430 and 1435. The input devices enable the user to communicate information and select commands to the computer system. The input devices 1430 include alphanumeric keyboards and cursor-controllers. The output devices 1435 display images generated by the computer system. The output devices include printers and display devices, such as cathode ray tubes ("CRT") or liquid crystal displays ("LCD").

Finally, as shown in FIG. 14, bus 1405 also couples computer 1400 to a network 1465 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1400 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. For example, in some embodiments, the set of rules that are based on the manufacturing settings are only used to modify the produced mask and not the IC design layout itself. In other words, the design of the IC layout does not take into account the manufacturing settings in such instances. Instead, only when the mask is produced based on the IC layout are the manufacturing settings taken into account. In such cases, the mask and the IC layout are defined with different attributes. Although various manufacturing settings are described, one of ordinary skill in the art that will realize that other possible settings can be specified. Accordingly, other set of design rules may be used to design the IC layout. Moreover, in some embodiments, a process can include both MAD and DAM processes. Thus, one of ordinary skill in the art would understand that the invention is not to be limited by the foregoing illustrative details, but rather is to be defined by the appended claims.

What is claimed is:

1. A manufacturing aware process for designing an integrated circuit ("IC") layout, the process comprising:
   a. receiving a manufacturing configuration that specifies a set of manufacturing settings for a set of machines to be used to manufacture an IC once the IC layout is designed, wherein the set of manufacturing settings comprises a specified first dipole lens and a second dipole lens for a first layer of the IC layout;
   b. prior to designing the IC layout, defining a set of design rules based on the specified manufacturing configuration; and
   c. after defining the set of design rules, designing the IC layout using the set of design rules, said designing performed by at least one computer.

2. The process of claim 1, wherein the set of manufacturing settings comprises a specified aperture setting for an illuminator.

3. The process of claim 2, wherein the set of design rules based on a specified large aperture mask specify smaller dimensional attributes for elements of the IC layout than the set of design rules based on a specified small aperture mask.

4. The process of claim 1, wherein the set of manufacturing settings comprises a specified nominal exposure.

5. The process of claim 1, wherein the set of manufacturing settings comprises a specified light wavelength for an illuminator.

6. The process of claim 5, wherein the set of design rules based on a specified shorter light wavelength specify smaller dimensional attributes for elements of the IC layout than the set of design rules based on a specified longer light wavelength.

7. The process of claim 5, wherein the set of design rules based on a specified shorter light wavelength specify a denser IC layout than the set of design rules based on a specified longer light wavelength.

8. The process of claim 6, wherein at least one of the elements is a contact.

9. The process of claim 6, wherein at least one of the elements is a route.

10. The process of claim 6, wherein at least one of the elements is a module.

11. The process of claim 1, wherein defining the set of manufacturing settings further comprises a specified first exposure and a second exposure for the first layer of the IC layout.

12. The process of claim 1, wherein the set of manufacturing settings further comprises at least one of a specified off-axis light source for the first layer of the IC layout and a specified on-axis light source for the first layer of the IC layout.

13. The process of claim 1, wherein the set of manufacturing settings comprises a specified modified annular lens for the first layer of the IC layout.

14. The process of claim 13, wherein defining the set of design rules comprises defining a narrow route in a first direction of the first layer and a wide route in a second direction of the first layer.

15. The process of claim 1, wherein the set of manufacturing settings comprises a specified first modified annular lens and a second modified annular lens for the first layer of the IC layout.

16. The process of claim 1, wherein the set of manufacturing settings comprises a specified quadrupole lens for the first layer of the IC layout.

17. The process of claim 1, wherein the set of manufacturing settings comprises a specified double dipole lens for the first layer of the IC layout.

18. The process of claim 1, wherein the specified manufacturing settings comprise specifying a stepper lens for each layer of the IC layout.

19. The process of claim 18, wherein defining the set of design rules comprises defining a first width for a first route for each layer of the IC layout based on the corresponding stepper lens.

20. A manufacturing aware process for designing an integrated circuit ("IC") layout, the process comprising:
   a. receiving a manufacturing configuration that specifies a set of manufacturing settings for a set of machines to be used to manufacture an IC once the IC layout is designed, wherein the set of manufacturing settings comprises a specified dipole lens for a first layer of the IC layout
   b. prior to designing the IC layout, defining a set of design rules based on the specified manufacturing configuration; and
   c. after defining the set of design rules, designing the IC layout using the set of design rules, said designing performed by at least one computer.

21. The process of claim 20, wherein defining the set of design rules comprises defining a narrow route in a first direction of the first layer and a wide route in a second direction of the first layer.

22. The process of claim 21, wherein the dipole lens comprises two poles that are vertically aligned, wherein the first direction is a horizontal direction.

23. The process of claim 21, wherein the dipole lens comprises two poles that are horizontally aligned, wherein the first direction is a vertical direction.

24. The process of claim 21, wherein the dipole lens comprises two poles that are 45° diagonally aligned, wherein the first direction is a 135° diagonal direction.

25. A computer readable medium storing a computer program that when executed by a processor performs a manufacturing aware process to design an integrated circuit ("IC") layout, the computer program comprising sets of instructions for:

a. receiving a manufacturing configuration that specifies a set of manufacturing settings for a set of machines to be used to manufacture an IC once the IC layout is designed, wherein the set of manufacturing settings comprises a specified first dipole lens and a second dipole lens for a first layer of the IC layout;

b. defining, prior to designing the IC layout, a set of design rules based on the specified manufacturing configuration; and c. designing, after defining the set of design rules, the IC layout using the set of design rules.

26. The computer readable medium of claim 25, wherein defining the set of manufacturing settings further comprises a specified first exposure and a second exposure for the first layer of the IC layout.

27. The computer readable medium of claim 25, wherein the set of manufacturing settings further comprises at least one of a specified off-axis light source for the first layer of the IC layout and a specified on-axis light source for the first layer of the IC layout.

28. A system comprising:

a processor for executing sets of instructions; and a memory for storing a computer program for performing a manufacturing aware process to design an integrated circuit ("IC") layout, the computer program comprising sets of instructions for:

a. receiving a manufacturing configuration that specifies a set of manufacturing settings for a set of machines to be used to manufacture an IC once the IC layout is designed, wherein the set of manufacturing settings comprises a specified first dipole lens and a second dipole lens of a first layer for the IC layout;

b. defining, prior to designing the IC layout, a set of design rules based on the specified manufacturing configuration; and c. designing, after defining the set of design rules, the IC layout using the set of design rules.

29. The system of claim 28, wherein defining the set of manufacturing settings further comprises a specified first exposure and a second exposure for the first layer of the IC layout.

30. The system of claim 28, wherein the set of manufacturing settings further comprises at least one of a specified off-axis light source for the first layer of the IC layout and a specified on-axis light source for the first layer of the IC layout.

31. A computer readable medium storing a computer program that when executed by a processor performs a manufacturing aware process to design an integrated circuit ("IC") layout, the computer program comprising sets of instructions for:

a. receiving a manufacturing configuration that specifies a set of manufacturing settings for a set of machines to be used to manufacture an IC once the IC layout is designed, wherein the set of manufacturing settings comprises a specified dipole lens for a first layer of the IC layout;

b. prior to designing the IC layout, defining a set of design rules based on the specified manufacturing configuration; and c. after defining the set of design rules, designing the IC layout using the set of design rules, said designing performed by at least one computer.

32. The computer readable medium of claim 31, wherein defining the set of design rules comprises defining a narrow route in a first direction of the first layer and a wide route in a second direction of the first layer.

33. The process of claim 31, wherein the dipole lens comprises two poles that are vertically aligned, wherein the first direction is a horizontal direction.

34. A system comprising:

a processor for executing sets of instructions; and a memory for storing a computer program for performing a manufacturing aware process to design an integrated circuit ("IC") layout, the computer program comprising sets of instructions for:

a. receiving a manufacturing configuration that specifies a set of manufacturing settings for a set of machines to be used to manufacture an IC once the IC layout is designed, wherein the set of manufacturing settings comprises a specified dipole lens for a first layer of the IC layout;

b. prior to designing the IC layout, defining a set of design rules based on the specified manufacturing configuration; and c. after defining the set of design rules, designing the IC layout using the set of design rules, said designing performed by at least one computer.

35. The system of claim 34, wherein defining the set of design rules comprises defining a narrow route in a first direction of the first layer and a wide route in a second direction of the first layer.

36. The system of claim 34, wherein the dipole lens comprises two poles that are horizontally aligned, wherein the first direction is a vertical direction.

* * * * *